United States Patent [19]

Bowers

[11] Patent Number: 5,688,093
[45] Date of Patent: Nov. 18, 1997

[54] EJECTING QUICK-CONNECT FASTENER

[76] Inventor: Ned C. Bowers, 7400 Ola Cir., Mt. Dora, Fla. 32757

[21] Appl. No.: 593,277

[22] Filed: Jan. 29, 1996

[51] Int. Cl.⁶ .................................................. F16B 21/00
[52] U.S. Cl. .......................... 411/552; 411/553; 411/544
[58] Field of Search ............................... 411/551, 552, 411/343, 544, 549, 553

[56] References Cited

U.S. PATENT DOCUMENTS

| | | |
|---|---|---|
| 2,486,411 | 11/1949 | Huelster . |
| 2,757,429 | 8/1956 | Summers . |
| 2,839,808 | 6/1958 | Zahodiakin . |
| 2,879,574 | 3/1959 | Zahodiakin . |
| 2,922,211 | 1/1960 | Boyd . |
| 3,136,017 | 6/1964 | Preziosi ................................ 411/552 |
| 4,442,571 | 4/1984 | Davis et al. ......................... 411/552 |
| 4,801,232 | 1/1989 | Hempel ................................ 411/552 |
| 5,370,488 | 12/1994 | Sykes . |

FOREIGN PATENT DOCUMENTS 428898  5/1935  United Kingdom .................. 411/552

*Primary Examiner*—Neill R. Wilson
*Attorney, Agent, or Firm*—Lane, Aitken & McCann

[57] ABSTRACT

A fastener for holding panels together includes a grommet for engaging a first panel, a stud received in the grommet, and a receptacle for securement to a second panel, wherein the receptacle includes a body having an internally threaded bore, an externally threaded barrel member in engagement with the threads of the bore, curved slots in the barrel member for receiving a cross pin of the stud, and a mechanical arrangement for selectively locking the barrel member from movement relative to the body. The grommet can include diametrically opposed slots having open ends extending through an end of the grommet for receiving the cross pin of the stud.

16 Claims, 5 Drawing Sheets

EJECTING QUICK-CONNECT FASTENER

BACKGROUND OF THE INVENTION

The present invention relates to quick-connect fasteners and, more particularly, to ¼ turn fasteners for holding panels together be fastened and unfastened quickly and repeatedly.

As can be seen from Prior Art FIG. 1, fasteners 10 of the ¼ turn type have been known which include a grommet 12 and a stud 14 mounted on a first panel and a receptacle 16 mounted on a second panel. The fastener 10 holds together the two panels 18 and 20, with adjacent sides of the panels in contact with one another, by extending through openings 22 and 24 formed in the panels to receive the fastener. The grommet 12 has a cylindrical body 26 sized to extend through the opening 22 in the first panel 18, usually an outer panel, and one end of the cylindrical body 26 has a radially outward extending flange 28 to engage the outer surface of the first panel 18. The stud 14 has a shaft 30 and a head 32, and is part of a fastener assembly with the grommet 12, a cross pin 34 extending through the shaft at an end opposite to the head, a cup member 36 slidable along the shaft, and a spring on the shaft between the head and cup member and received in the cup member. The stud 14 is received in the grommet 12, with the head 32 of the stud being adjacent to the flange 28 on the grommet and a radially outward extending flange 38 on the cup member 36 engaging a radially inward extending flange 40 at the end of the grommet 12 opposite to the radially outward extending flange 28. This arrangement keeps the head 32 of the stud 14 biased by the spring slightly outward from the radially outward extending flange 28 at the outer side of the first panel 18. The cross pin 34 on the stud 14 prevents the assembly of the grommet 12 and the stud 14 from separating from the first panel 18.

The receptacle 16 of the fastener 10 has a generally cylindrical body 42 and a flange 44 projecting radially outward from one end of the body. The receptacle body 42 defines a central opening and has cam and locking surfaces 46 defined at an end opposite the radially outward extending receptacle flange 44. The receptacle flange 44 is placed against and secured to a side of the second panel 20, usually an inner panel, opposite to the side contacting the first panel 18, with the receptacle body 42 extending away from the side of the second panel 20 to which the flange is attached. The panels 18 and 20 are brought together so that the stud 14 and the receptacle 16 are in alignment. The head 32 of the stud 14 is engaged by a turning tool, such as a screwdriver, pushed inwardly against the bias of the spring, and turned ¼ turn with the cross pin 34 of the stud in engagement with the cam and locking surfaces 46 of the receptacle 16. This action locks the fastener 10 in place with the two panels 18 and 20 in secure engagement with one another.

A drawback of such a fastener is that, when the fastener is in a released condition, the cross pin 34 and a significant portion of the stud shaft 30 are free to extend beyond the cup member 36 and the grommet 12 toward the second panel 20. This extension of the stud 14 and the cross pin 34 interferes with proper positioning of the first panel 18 on the second panel 20, because the extending stud and cross pin "hang up" on any of various surfaces as the portion of the fastener 10 including the stud and cross pin is being aligned with the portion of the fastener including the receptacle 16. In a "hang up", the extending stud 14 and cross pin 34 prevent proper alignment and securement of the fastener 10. In such a situation, the head 32 of the stud 14 must be pulled outward to reduce the inward extension of the stud 14 and cross pin 34, and thereby eliminate the interference of the stud and cross pin with the proper alignment of the two portions of the fastener 10. Typically, the first panel 18 is provided with a plurality of spaced fasteners 10. As a result, the placement of the first panel 18 relative to the second panel 20 becomes difficult as an installer tries to hold the first panel in position while trying to pull out the stud 14 on a plurality of fasteners 10 to eliminate interference caused by the inward extension of the studs 14 and cross pins 34. Placement of the first panel is especially difficult where the first panel 18 is a curved panel, such as an aircraft engine cowling panel.

SUMMARY OF THE INVENTION

By the present invention, interference in the alignment and securement of a first panel with a second panel by extension of a stud and a cross pin from a fastener assembly of a quick-connect fastener is eliminated. Undue extension of the stud and the cross pin from the fastener assembly on the first panel, which comprises a first portion of the quick-connect fastener, is prevented by the provision of an ejection spring which ejects the stud, moving a cup member, a fastener locking spring, the stud and the cross pin away from a second portion of the fastener having a receptacle for the stud and cross pin. The ejection spring moves the stud and the cross pin to at least a point at which the cross pin engages a bottom surface of a grommet which is included in the first portion of the fastener. Diametrically opposed slots can be formed in an end of the grommet facing the second portion of the fastener to receive the cross pin, and thereby further ejection of the stud and the cross pin are achieved. The slots can be defined in part by angled guide surfaces extending over substantial portions of the end of the grommet to guide the cross pin into the slots when the cross pin is in any of a wide range of angles around the end of the grommet.

DETAILED DESCRIPTION OF THE PREFERRED EMBODIMENTS

Figure 1:
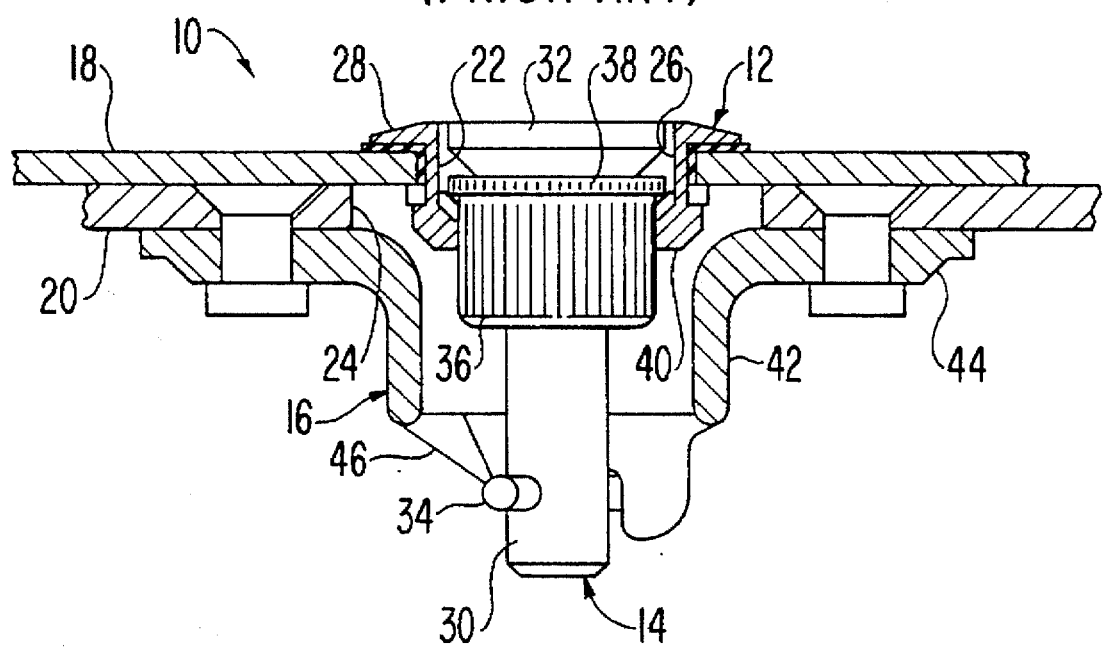
FIG. 1 is a cross section of a prior art fastener holding two panels together.
Figure 2:
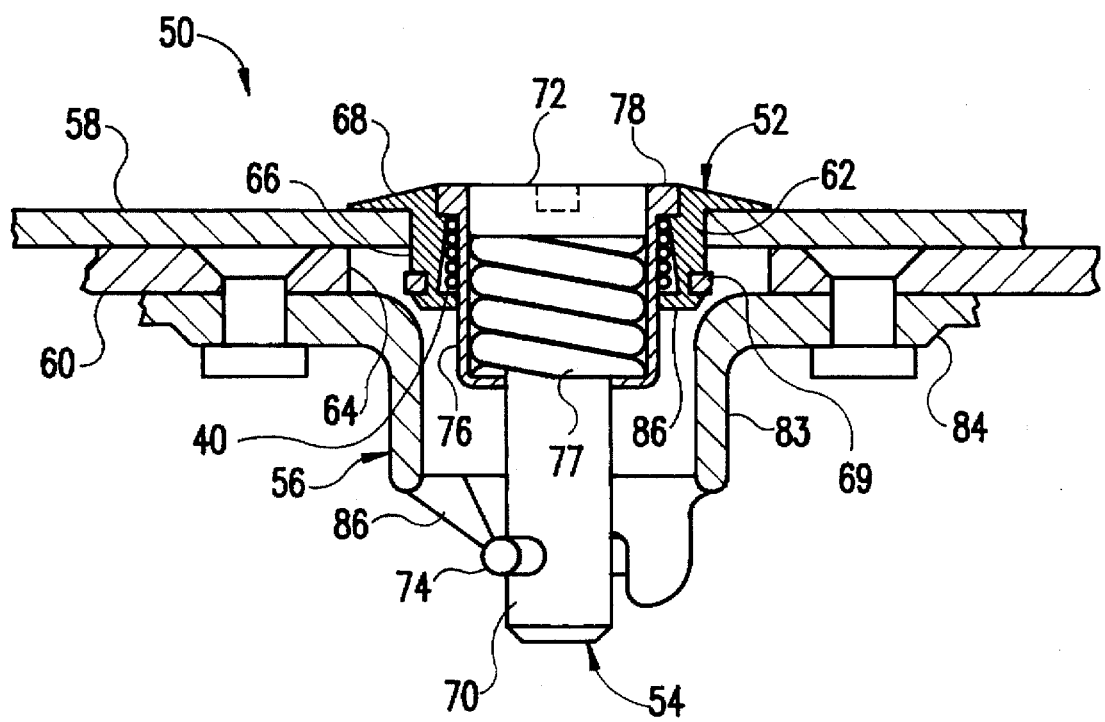
FIG. 2 is a cross section of a fastener according to the present invention holding two panels together.

As can be seen from FIG. 2, the fastener according to the present invention, which is designated generally by the reference numeral 50, is of the ¼ turn type, having a grommet 52, a stud 54, and a receptacle 56. The fastener 50 holds together two panels 58 and 60, with adjacent sides of the panels in contact with one another, by extending through openings 62 and 64 formed in the panels to receive the fastener. The grommet 52 has a cylindrical body 66 sized to extend through the opening 62 in one of the panels 58, usually an outer panel, and one end of the cylindrical body 66 has a radially outward extending flange 68 to engage the outer surface of the outer panel 58. The other end of the cylindrical body 66 has an annular groove to receive a retaining ring 69 for retaining the grommet 52 on the outer panel 58. The stud 54 has a shaft 70, a head 72, a cross pin 74 extending through the shaft at an end opposite to the head, a cup member 76 slidable along the shaft and a locking spring 77 mounted on the shaft between the head and cup member and received in the cup member. The cylindrical body 66 of the grommet 52 has a perimetric wall defining an opening through the grommet 52, the perimetric wall being sized such that the cup member 76 is slidingly received in the cylindrical body 66. The stud 54 is received in the grommet 52, with the head 72 of the stud being adjacent to the flange 68 on the grommet and a radially outward extending flange 78 on the cup member 76 engaging a radially inward extending shoulder 80 (FIG. 3) defined by a counterbore 82 at the end of the grommet 52 adjacent to the radially outward extending flange 68. This arrangement keeps the head 72 of the stud 54 biased by the locking spring 77 slightly outward from the radially outward extending flange 68 at the outer side of the outer panel 58. The cross pin 74 on the stud 54 prevents the assembly including the grommet 52 and the stud 54 from separating from the outer panel 18.

The receptacle 56 of the fastener 40 can be a conventional receptacle, having a generally cylindrical body 83 and a flange 84 projecting radially outward from one end of the body. The receptacle body 83 defines a central opening and has cam and locking surfaces 86 defined at an end opposite the radially outward extending receptacle flange 84. The receptacle flange 84 is placed against and secured to a side of the second panel 60, usually an inner panel, opposite to the side contacting the first panel 58, with the receptacle body 83 extending away from the side of the second panel 60 to which the flange is attached. The panels 58 and 60 are brought together so that the stud 54 and the receptacle 56 are in alignment. The head 72 of the stud 54 is engaged by a turning tool, such as a screwdriver, pushed inwardly against the bias of the locking spring 77, and turned ¼ turn with the cross pin 74 of the stud in engagement with cam and locking surfaces 86 on the receptacle 56. This action locks the fastener 50 in place with the two panels 58 and 60 in secure engagement with one another. The receptacle 56 can have other configurations, as long as the receptacle is capable of cooperating with the cross pin 74.

Figure 3:
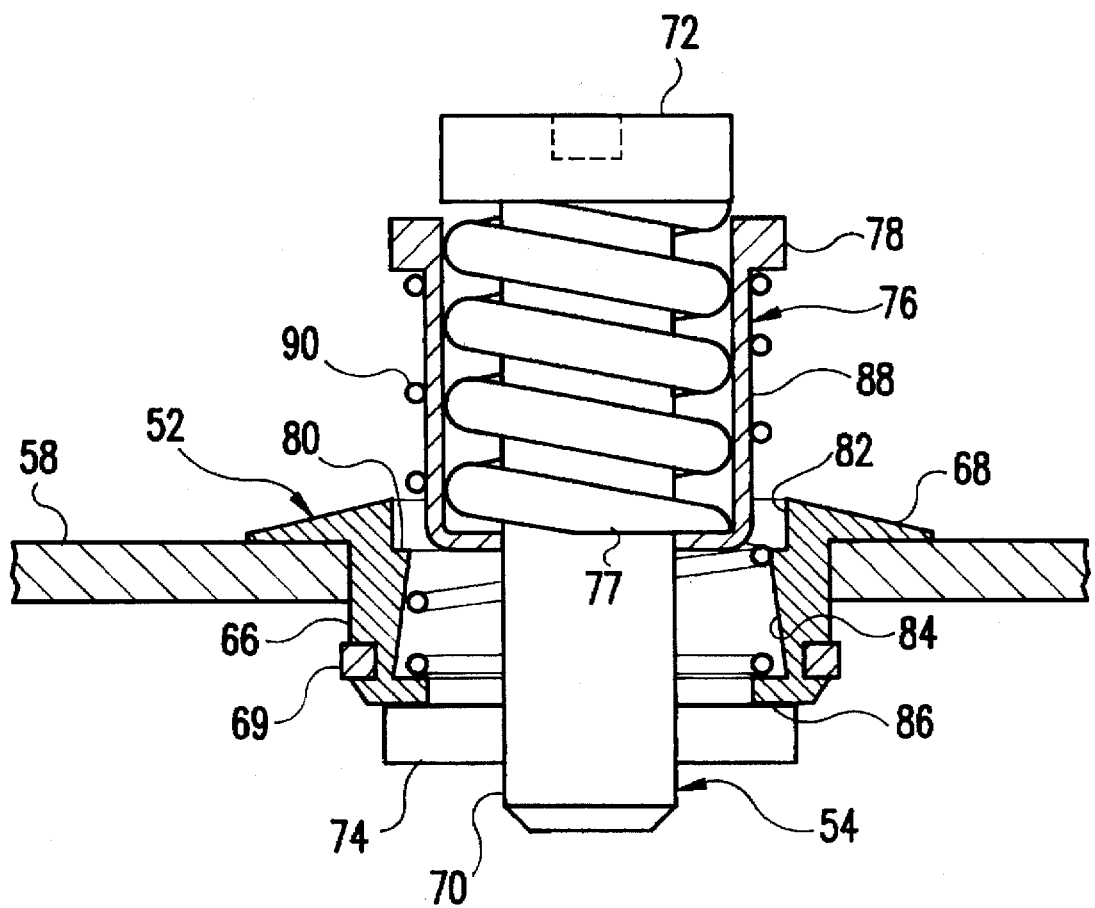
FIG. 3 is an enlarged cross section of a portion of the fastener of FIG. 2 in the released, ejected position, with the stud rotated slightly.

As can be seen from FIG. 3, the grommet 52 defines a main bore 84, a radially inwardly directed annular flange 86 at the bottom of the main bore, and the counterbore 82 at the top of the main bore. The counterbore 82 has a diameter just slightly greater than the outer diameter of the flange 78 at the top of the cup member 76 so that the counterbore receives the cup member. The shoulder 80 on the grommet 52 at the bottom of the counterbore 82 engages a lower surface of the flange 78 of the cup member 76 and supports the cup member in the grommet. The cup member 76 has a body 88 defining a cylindrical outer surface, and the radially inwardly extending flange 86 at the bottom of the grommet 52 has an inner diameter just sufficiently larger than the outer diameter of the body 88 of the cup member that the body of the cup member may slide through an opening defined by the inwardly directed flange. The main bore 84 of the grommet 52 is defined by an annular surface which is spaced radially from the outer surface of the body 88 of the cup member 76 to define an annular chamber. A compression coil spring 90 is positioned in the annular chamber, around the cup member body 88, and in the main bore 84 of the grommet 52. One end of the coil spring 90 engages the radially inwardly extending flange on the grommet, and the other end of the ejecting spring engages the lower surface of the flange of the cup member.

As can be appreciated from FIGS. 2 and 3, when the fastener 50 is in a fastening position, the ejecting spring 90 is compressed, with the flange 78 on the cup member 76 in engagement with the shoulder 80 in the counterbore 82 of the grommet 52. However, when the fastener 50 is released by turning the stud 54, the ejecting spring 90 expands, moving the cup member 76 upward and, with the cup member, moving the locking spring 77, the stud 54, and the cross pin 74 upward until the cross pin engages a bottom surface of the grommet 52. It can be appreciated from FIG. 3 that the length of the cross pin 74 is greater than the diameter of the opening defined by the radially inwardly extending flange 86 on the grommet 52. The biasing force of the locking spring 77 is greater than the biasing force of the ejecting spring 90. With the stud 54 ejected to this point, there is very little likelihood of the stud or the cross pin 74 hanging up as the panel 58, with the outer portion of the fastener 50, is being aligned for engagement with the inner portion of the fastener.

Figure 4:
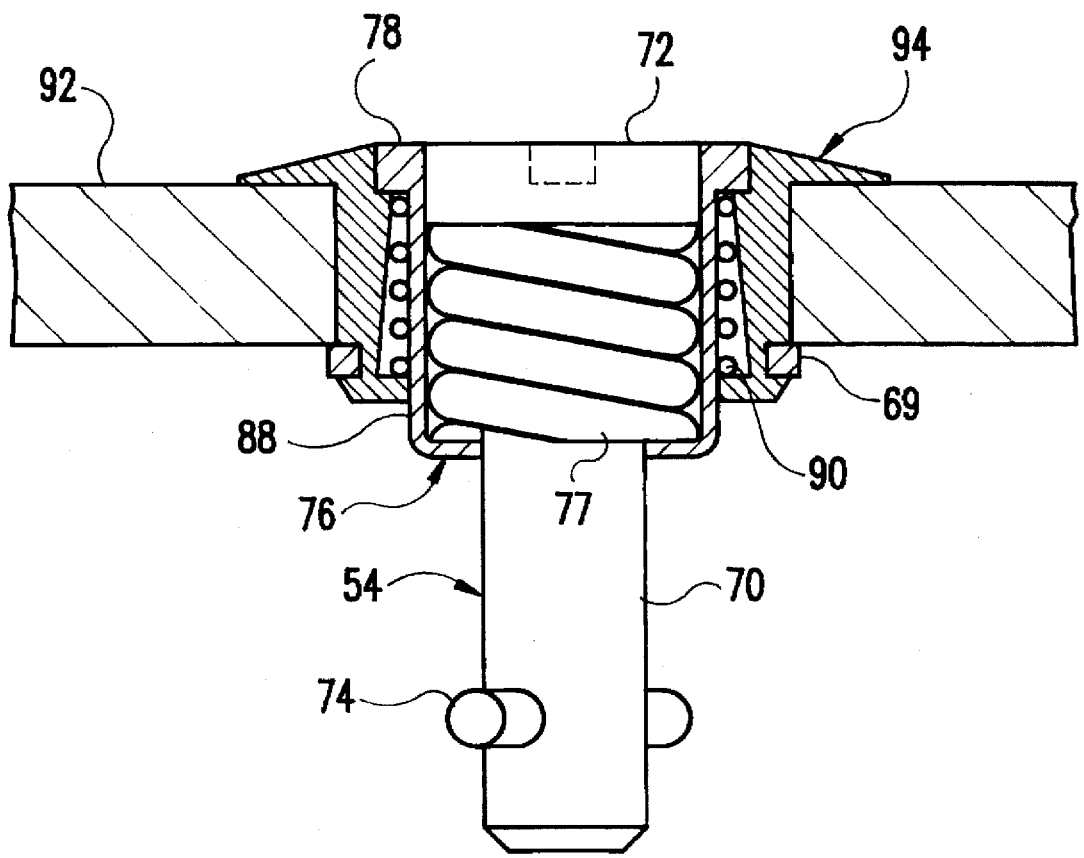
FIG. 4 is a cross section of a portion of a fastener according to the present invention in a fastening position, employing a longer grommet to accommodate a thicker panel.

As can be seen from FIG. 3, the axial distance from the radially outward extending flange 68 on the grommet 52 to the locking ring 69 is greater than the thickness of the plate 58. Accordingly, plates with greater thickness than the thickness of the illustrated plate 58 can employ the grommet 52 of FIG. 3. As can be seen from FIG. 4, when it is desired to secure even thicker panels, such as a panel 92, a grommet 94 is used which is like the grommet 52 of FIGS. 2 and 3 in all respects except that it has a greater axial dimension for accommodating the panels of greater thickness.

Figure 5:
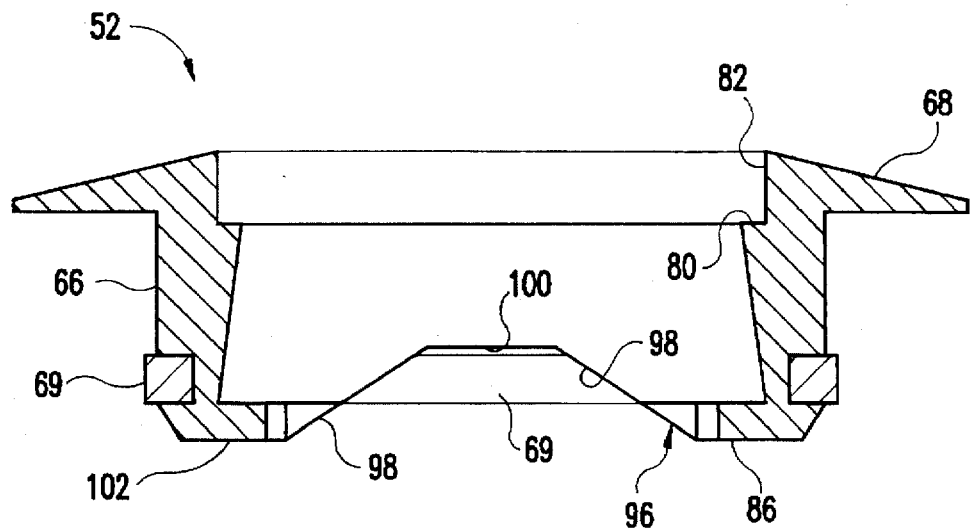
FIG. 5 is a cross section of the grommet and snap ring of the fastener portions of FIG. 3.
Figure 6:
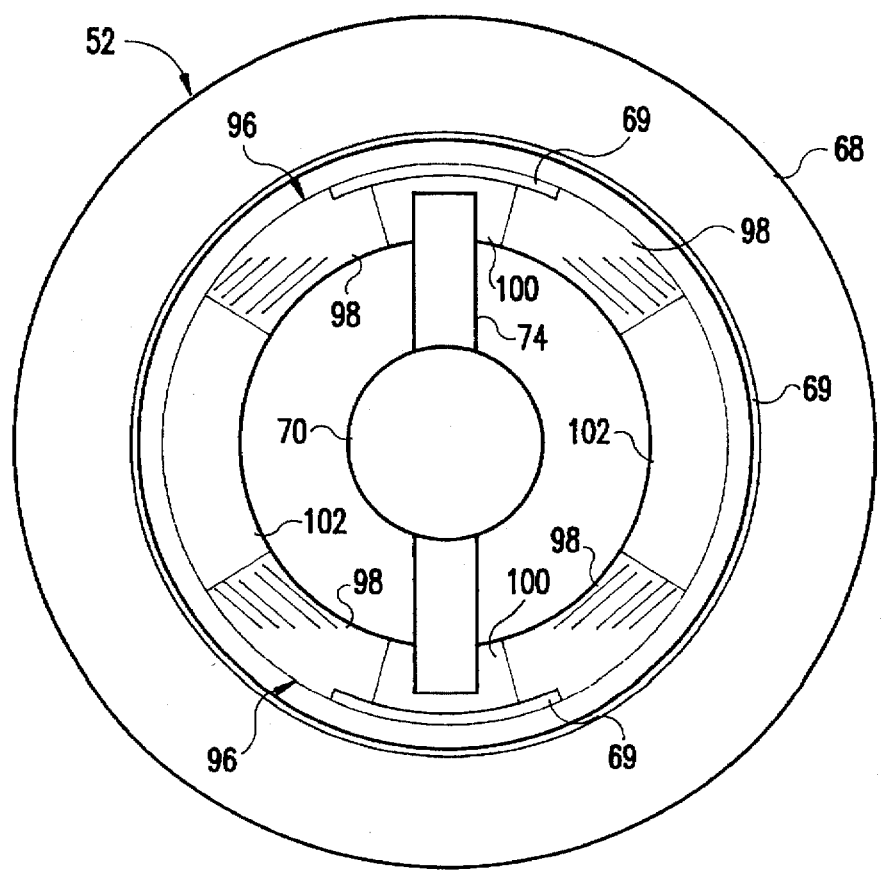
FIG. 6 is a bottom view of the grommet of FIG. 5, with a stud and cross pin shown in position.

As can be seen from FIGS. 5 and 6, in order to obtain more complete ejection of the stud 54 and the cross pin 74, the bottom of the grommet 52 can define diametrically opposed recesses 96 each having sloped surfaces 98 extending between a recess bottom 100 and the bottom surface 102 of the grommet 52. It is preferred to extend the sloped surfaces 98 over a large portion of the circumference of the grommet 52 so that each recess 96 extends, for example, over more than 90° of the circumference and the cross pin 74 will be guided and turned by the slope of the sloped surfaces 98 and the biasing force of the ejection spring 90 into the recesses 96 wherever in a large portion of the circumference the cross pin engages the grommet. The axial distance between the bottom 100 of the recess and the bottom surface 102 of the grommet is sufficient to completely accommodate the cross pin 74. Furthermore, it can be seen from FIG. 5 that the bottom 100 of the recess 96 is above the locking ring 69. It can be seen from FIG. 3 that the length of the cross pin 74 is less than the inner diameter of the locking ring 69 and greater than the inner diameter of the cylindrical body 66 of the grommet 52 so that the cross pin can move upward through the locking ring to the bottom surface 100 of the recess.

Having thus described the present invention and its preferred embodiments in detail, it will be readily apparent to those skilled in the art that further modifications to the invention may be made without departing from the spirit and scope of the invention as presently claimed.

I claim:

1. A fastener assembly for holding together first and second elements, wherein each element has an aperture for receiving the fastener, a first side in engagement with the other of said elements, and a second side facing away from the other of said elements, comprising:

a grommet for extending through the aperture of the first element, said grommet having a perimetric wall defining an opening through the grommet;

a stud having opposite ends, a head at one of said ends, and a cross pin adjacent to the other of said ends for connecting the fastener assembly to a receptacle secured to the second element, said stud being received in the opening of the grommet;

a member interposed between said stud and said grommet, said member being moveable relative to said stud; and means for ejecting the stud to a point at which said cross pin engages said grommet when the fastener assembly is disconnected from the receptacle.

a receptacle for mounting in the aperture of the second element.

2. The fastener assembly of claim 1, wherein said member is a cup member positioned in the opening defined by the perimetric wall of said grommet, and said ejecting means comprises biasing means interposed between said cup member and said grommet for moving said cup member relative to said grommet in a direction from the cross pin to the head of the stud.

3. The fastener assembly of claim 2, wherein said biasing means comprises a compression coil spring encircling said cup member and said cup member and said grommet each have a flange, said spring having a first end engaging the flange on said cup member and a second end engaging the flange on said grommet.

4. The fastener assembly of claim 3, wherein the flange on said grommet is an annular flange extending radially inward.

5. The fastener assembly of claim 1, wherein the perimetric wall of said grommet has an end proximate to said cross pin and diametrically opposed recesses defined in said perimetric end to receive said cross pin.

6. The fastener assembly of claim 5, wherein each said recess has sloped surfaces and extends over more than 90° of the perimeter of the perimetric wall of said grommet.

7. The fastener assembly of claim 5, further comprising a locking ring secured to said grommet adjacent to said end of the perimetric wall of the grommet, wherein said locking ring has an inner diameter and said cross pin has a length, the inner diameter of said locking ring being greater than the length of said cross pin, whereby said cross pin can pass through said locking ring.

8. The fastener assembly of claim 2, further comprising a fastener locking spring positioned between said stud and said cup member and a radially inwardly extending flange on said cup member, the fastener locking spring having a first end contacting the head of the stud and a second end contacting the radially inwardly extending flange on said cup member.

9. A fastener for holding together first and second elements, wherein each element has an aperture for receiving the fastener, a first side in engagement with the other of said elements, and a second side facing away from the other of said elements, comprising:

a fastener assembly including a grommet for extending through the aperture of the first element, said grommet having a perimetric wall defining an opening through the grommet;

a stud having opposite ends, a head at one of said ends, and a cross pin adjacent to the other of said ends for connection to a receptacle secured to the second element, said stud being received in the opening of the grommet;

a member interposed between said stud and said grommet, said member being moveable relative to said stud; and means for ejecting the stud to a point at which said cross pin engages said grommet when the fastener assembly is disconnected from the receptacle; and a receptacle for mounting in the aperture of the second element.

10. The fastener of claim 9, wherein said member is a cup member positioned in the opening defined by the perimetric wall of said grommet, and said ejecting means comprises biasing means interposed between said cup member and said grommet for moving said cup member relative to said grommet in a direction away from the receptacle.

11. The fastener of claim 10, wherein said biasing means comprises a compression coil spring encircling said cup member and said cup member and said grommet each have a flange, said spring having a first end engaging the flange on said cup member and a second end engaging the flange on said grommet.

12. The fastener of claim 11, wherein the flange on said grommet is an annular flange extending radially inward.

13. The fastener of claim 9, wherein the perimetric wall of said grommet has an end proximate to said cross pin and diametrically opposed recesses defined in said proximate end to receive said cross pin.

14. The fastener of claim 13, wherein each said recess has sloped surfaces and extends over more than 90° of the perimeter of the perimetric wall of said grommet.

15. The fastener of claim 13, further comprising a locking ring secured to said grommet adjacent to said end of the perimetric wall of the grommet, wherein said locking ring has an inner diameter and said cross pin has a length, the inner diameter of said locking ring being greater than the length of said cross pin, whereby said cross pin can pass through said locking ring.

16. The fastener of claim 10, further comprising a fastener locking spring positioned between said stud and said cup member and a radially inwardly extending flange on said cup member, the fastener locking spring having a first end contacting the head of the stud and a second end contacting the radially inwardly extending flange on said cup member.

* * * * *